United States Patent
Jeon et al.

(10) Patent No.: US 10,471,834 B2
(45) Date of Patent: Nov. 12, 2019

(54) HYBRID VEHICLE AND METHOD FOR CONTROLLING THE SAME

(71) Applicants: Hyundai Motor Company, Seoul (KR); Kia Motors Corporation, Seoul (KR)

(72) Inventors: Jae Hwa Jeon, Gyeonggi-do (KR); Sang Kyu Lee, Gyeonggi-do (KR); Kil Young Youn, Gyeonggi-do (KR); Seung Hyeon Bin, Busan (KR); Gu Bae Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 27 days.

(21) Appl. No.: 15/848,864

(22) Filed: Dec. 20, 2017

(65) Prior Publication Data

US 2018/0354376 A1    Dec. 13, 2018

(30) Foreign Application Priority Data

Jun. 8, 2017  (KR) .................. 10-2017-0071745

(51) Int. Cl.
*B60L 58/10* (2019.01)
*B60L 11/18* (2006.01)
*B60L 53/14* (2019.01)
*B60L 53/30* (2019.01)

(52) U.S. Cl.
CPC .......... *B60L 11/1816* (2013.01); *B60L 53/14* (2019.02); *B60L 53/30* (2019.02); *B60L 58/10* (2019.02); *B60L 2240/36* (2013.01); *B60Y 2306/05* (2013.01); *B60Y 2400/89* (2013.01)

(58) Field of Classification Search
CPC ...... B60L 11/1816; B60L 53/14; B60L 58/10; B60L 53/30; B60L 2240/36; B60Y 2306/05; B60Y 2400/89
USPC .......................................................... 701/22
See application file for complete search history.

(56) References Cited

U.S. PATENT DOCUMENTS

| | | | |
|---|---|---|---|
| 2009/0139781 A1* | 6/2009 | Straubel | B60L 50/64 180/65.1 |
| 2015/0291043 A1* | 10/2015 | Nam | B60L 11/184 320/137 |
| 2016/0332505 A1* | 11/2016 | Yamanaka | B60H 1/00899 |

* cited by examiner

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

A plug-in vehicle capable of wired-charging a battery through a charging connector using an external charger and a method for controlling the same are provided. The method for controlling charging of a vehicle configured to perform a charging operation using external power includes determining whether a refrigerant circulation device operates normally and the amount of refrigerant is normal when a temperature sensor of a charger malfunctions. When the refrigerant circulation device operates normally and the amount of refrigerant is normal, a temperature of the charger is estimated using a temperature of a heat dissipation device through which the refrigerant passes and the output of the charger is adjusted based on the estimated temperature.

17 Claims, 4 Drawing Sheets

HYBRID VEHICLE AND METHOD FOR CONTROLLING THE SAME

CROSS-REFERENCE TO RELATED APPLICATION(S)

This application claims the benefit of Korean Patent Application No. 10-2017-0071745, filed on Jun. 8, 2017, which is hereby incorporated by reference as if fully set forth herein.

BACKGROUND

Field of the Invention

The present invention relates to a plug-in vehicle capable of wired-charging a battery through a charging connector using an external charger and a method for controlling the same, and more particularly, to a plug-in vehicle capable of coping with a faulty operation or malfunction of a charger based on a specific charging scheme and a method for controlling the same.

Discussion of the Related Art

Recently, hybrid electric vehicles (HEVs) have drawn attention as eco-friendly vehicles. Typically, a hybrid electric vehicle (HEV) refers to a vehicle that uses two power sources together. The two power sources are mainly an engine and an electric motor. HEVs are recently under vigorous development because HEVs are superior to vehicles provided with an internal combustion engine alone in terms of fuel efficiency, power performance, and exhaust gas reduction.

Among HEVs, for a plug-in hybrid electric vehicle (PHEV), a plug is connected to the PHEV and thus a battery that drives an electric motor may be charged with external power. Further, as another type of eco-friendly vehicle, electric vehicles (EVs) are also drawing attention. An electric vehicle is driven using an electric motor and thus requires charging of a battery to drive the electric motor.

The above-described EV or PHEV, which executes wired charging using an external charger, will hereinafter be referred to as a plug-in vehicle or a connector-charge-type vehicle. FIG. 1 is a diagram showing an example of a wired charging system for a general vehicle according to the related art.

Although a charging system of an electric vehicle (EV) or a plug-in electric vehicle (PEV) is exemplarily shown in FIG. 1, the charging system of FIG. 1 is similarly applicable to a PHEV except for parts related to an engine driven using fossil fuel. Referring to FIG. 1, the charging system 100 of the EV may include a power line communication (PLC)/electric vehicle communication controller (EVCC) 110 configured to execute rapid charging, an on-board charger (OBC) 120 configured to execute slow charging, a battery management system (BMS) 130, a battery 140, and a charging connector sensor 150.

The EVCC 110, the OBC 120, and the BMS 130 may be connected to one another via controller area network (CAN) communication. In addition, the charging system 100 may be connected to a charger (electric vehicle supply equipment (EVSE)) 200 via a charging connector. The charger 200 transmits a pulse width modulation (PWM) signal to a vehicle via a control pilot (C/P) line and the vehicle determines whether slow charging or rapid charging is performed through a duty ratio of the PWM signal (e.g., a ratio of the H signal and L signal of the pulse width).

Further, the charging connector sensor 150 may be configured to sense whether the charging connector is fastened to a charging inlet of the vehicle through a proximity detection method. The BMS 130 may be configured to acquire charging state information via CAN communication with the EVCC 110 and the OBC 120, and may be configured to monitor a vehicle power supply state. Meanwhile, heat may occur not only during traveling of an eco-friendly vehicle, but also during charging of the eco-friendly vehicle, such that cooling of a powertrain system is indispensable.

FIG. 2 is a block diagram illustrating a cooling system of a general eco-friendly vehicle according to the related art. Referring to FIG. 2, the cooling system may include a reservoir tank 210 configured to store a coolant, an electric water pump (EWP) 220 configured to circulate the coolant along a cooling channel 260, an electronic power control unit (EPCU) 230, an OBC 120, an electric motor 240, and a radiator fan 250 configured to cool the coolant. The EPCU 230 is a type of electronic control unit (ECU). As a representative example of the EPCU 230, a battery management system (BMS), a motor control unit (MCU) configured to operate an electric motor 240, or a hybrid control unit (HCU) operating as a high-order controller configured to operate the above-mentioned controllers may be used as the EPCU 230.

The cooling system of FIG. 2 is only exemplary, and the actual vehicle may include a larger or smaller number of constituent elements as compared to FIG. 2. For example, some high-voltage systems including a high-voltage battery and the like are emitted from FIG. 2. In addition, the arrangement order of constituent elements may also be changed in the direction of coolant as necessary.

In a general eco-friendly vehicle, each of the OBC 120 and the EPCU 230 may include a temperature sensor. A temperature sensor included in the OBC 120 may protect overheating of a power device, and the EPCU 230 may include a temperature sensor configured to measure a temperature of a heat sink required for rapid heat emission. The temperature sensor included in the EPCU 230 may be configured to sense a temperature of an inverter power module and a coolant temperature.

However, in the case of the above-mentioned cooling system, when a faulty operation occurs in the temperature sensor included in the OBC 120 during slow charging to be executed by the OBC 120, the charging operation is stopped, such that a power device embedded in the OBC 120 may be prevented from being damaged. However, when the above-mentioned control is performed, it may be difficult to perform slow charging even though the faulty operation has occurred only in the temperature sensor, resulting in reduction of system efficiency.

SUMMARY

Accordingly, the present invention is directed to a plug-in vehicle and a method for controlling the same that substantially obviate one or more problems due to limitations and disadvantages of the related art. An object of the present invention is to provide a method for more efficiently performing battery charging in a vehicle capable of wired-charging a battery using external power, and an eco-friendly vehicle for performing the same. Another object of the present invention is to provide an eco-friendly vehicle capable of performing battery charging even when a faulty operation or malfunction occurs in a specific charger.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling charging of a vehicle configured to perform charging using external power may include: when a faulty operation occurs in a temperature sensor of a charger, determining whether a refrigerant circulation operates normally and the amount of refrigerant is considered normal; when the refrigerant circulation is determined to operate normally and the amount of refrigerant is considered normal, estimating a temperature of the charger using a temperature of a heat dissipation device of the controller through which the refrigerant passes; and adjusting output of the charger based on the estimated temperature.

In accordance with another aspect of the present invention, a vehicle for performing charging using external power may include: a charger having a temperature sensor, configured to charge a battery using the external power; and an electronic power control unit (EPCU) configured to determine whether a refrigerant circulation operates normally and the amount of refrigerant is considered normal when a faulty operation occurs in the temperature sensor, estimate a temperature of the charger using a temperature of a heat dissipation device contained in the electronic power control unit (EPCU) when the refrigerant circulation operates normally and the amount of refrigerant is considered normal, and adjust output of the charger based on the estimated temperature. The refrigerant circulated by the refrigerant circulation device passes through the charger and the electronic power control unit (EPCU) through a single cooling channel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
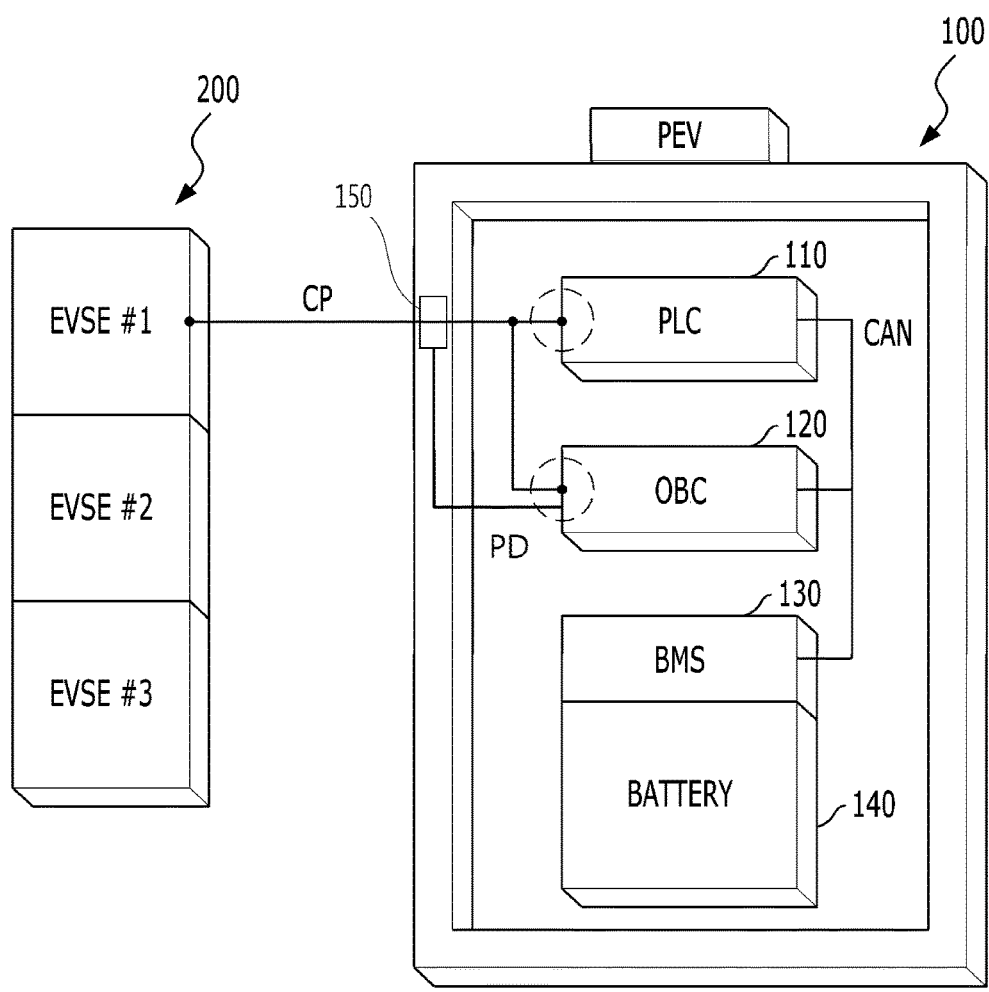
FIG. 1 is a diagram showing an example of a charging system for a general vehicle according to the related art.
Figure 2:
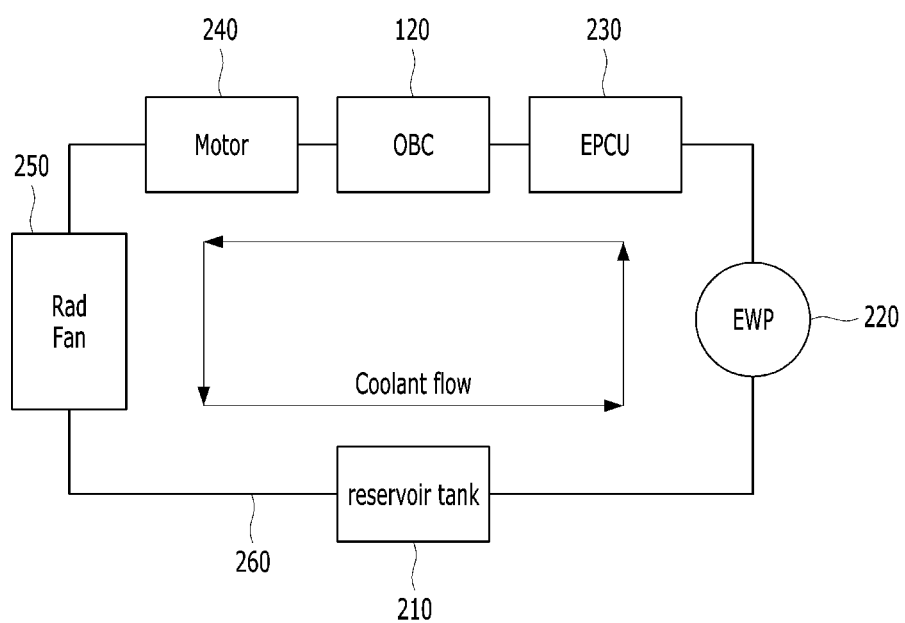
FIG. 2 is a block diagram illustrating a cooling system of a general eco-friendly vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

In the following description, known functions or structures, which may confuse the substance of the present invention, are not explained. While the present invention permits a variety of modifications and changes, specific exemplary embodiments of the present invention illustrated in the drawings will be described below in detail. However, the detailed description is not intended to limit the present invention to the described specific forms. Rather, the present invention includes all modifications, equivalents, and substitutions without departing from the spirit of the invention as defined in the claims.

The exemplary embodiment of the present invention provides a method for performing OBC cooling control using information capable of substituting for OBC temperature although a faulty operation occurs in a temperature sensor of the OBC, such that slow charging may be performed normally. In accordance with one aspect of the present invention, the information capable of substituting for OBC temperature may be a refrigerant temperature. In accordance with one aspect of the present invention, the refrigerant temperature may be acquired using a temperature sensor disposed in a heat dissipation device of the controller through which the refrigerant passes.

For example, the refrigerant may be a coolant, the controller and the heat dissipation device through which the refrigerant passes may be an EPCU and a heat sink disposed in the EPCU, respectively. The refrigerant circulation device may be an electric water pump (EWP). However, the above example is disclosed only for illustrative purposes, and the scope and spirit of the embodiments of the present invention are not limited to the refrigerant, the refrigerant circulation device, the heat dissipation device, and the controller through which the refrigerant passes.

Figure 3:
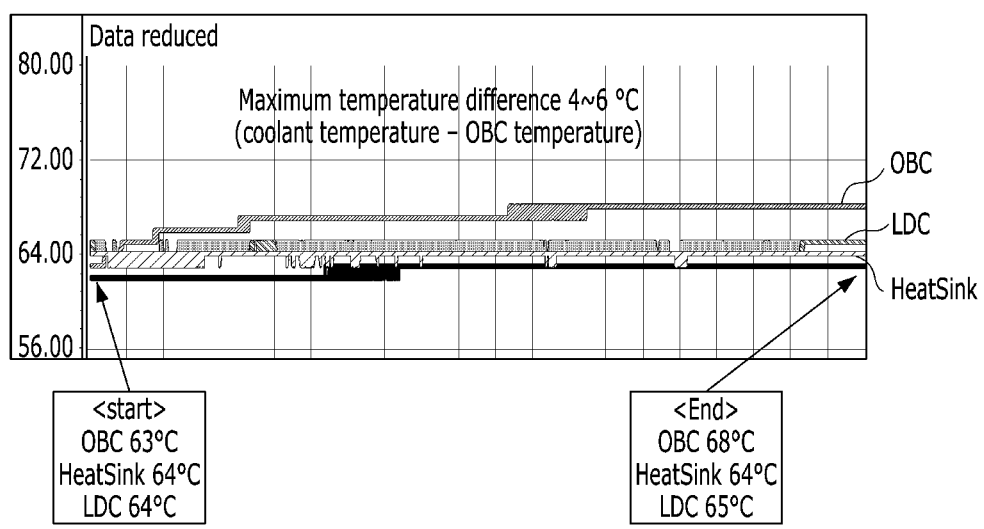
FIG. 3 is a view illustrating the relationship between a temperature of the OBC and a coolant temperature according to an exemplary embodiment of the present invention.

The relationship between the OBC temperature and the coolant temperature will hereinafter be described with reference to FIG. 3. FIG. 3 is a view illustrating the relationship between an OBC temperature and a coolant temperature. In FIG. 3, a horizontal axis may denote a time, and a vertical axis may denote a temperature. Temperature measurement results obtained when an applicant or inventor measures temperatures of the respective constituent elements contained in the eco-friendly vehicle according to the following conditions are shown in FIG. 3.

In an experimental condition, an initial coolant temperature may be 65° C., the amount of coolant circulation per minute may be 8 Liter Per Minute (LPM), and the OBC performs slow charging at a rated output of 6.6 kW. Referring to FIG. 3, in the initial stage of the experiment, the OBC temperature may be 63° C., a heat-sink temperature of the EPCU may be 64° C., and a Low DC-DC converter (LDC) temperature may be 64° C. Upon completion of the experiment, an OBC temperature may be 68° C., a heat-sink temperature may be 64° C., and an LDC temperature may be 65° C.

In the above-mentioned environment, the experimental results obtained when the conditions are changed in various ways are shown in the following table 1.

temperature (i.e., OBC temperature-HeatSink temperature) is denoted by 4~8° C. In contrast, under the assumption that the coolant flow rate is denoted by 0 LPM (i.e., when the faulty operation occurs in the EWP), a saturation temperature of the OBC exceeds an over-temperature protection level (generally, 80° C.), and thus, a temperature difference between the OBC and the heat sink increases.

Through the result of Table 1, although the faulty operation occurs in the OBC temperature sensor, under the assumption that a predetermined coolant flow rate (e.g., 4 LPM or greater) exists, the OBC may be determined to be sufficiently cooled by continuation of the charging operation. In the situation having the predetermined coolant flow rate, the OBC temperature is not much greater than the heat-sink temperature (e.g., a difference in temperature between the OBC and the heat sink is about 4-8° C.), and thus, the OBC temperature may be estimated based on the heat-sink temperature.

Therefore, although the faulty operation occurs in the OBC temperature sensor, the EWP may be mandatorily driven, and slow charging may be continued based on the heat-sink temperature. However, in a first case (1) in which the faulty operation occurs in the EWP, and also in a second case (2) in which the amount of coolant is insufficient and it may be impossible to recognize the coolant flow rate, the OBC may stop operation. In the first case (2) indicating the faulty operation of the EWP, the OBC temperature increases substantially compared to the heat-sink temperature. In the second case (2) indicating the insufficient amount of coolant, it may be difficult to guarantee sufficient cooling. Accordingly, the OBC may stop operation. The above-mentioned OBC charging available conditions are shown in the following table 2.

TABLE 2

| Condition | | Operation or non-operation of OBC | |
|---|---|---|---|
| | | General vehicle | Inventive Vehicle |
| Faulty operation of OBC temperature sensor | EWP faulty operation | X | X |
| | Abnormal coolant flow rate | X | X |
| | EWP and normal coolant flow rate | X | O (EWP is mandatorily driven) |

TABLE 1

| | Coolant temperature [° C.] | | | | | | | |
|---|---|---|---|---|---|---|---|---|
| | 25 | | | | 65 | | | |
| Coolant flow rate (LPM) | OBC temperature | OBC temperature increase | Heat-Sink temperature | Temperature difference (OBC-HeatSink) | OBC temperature | OBC temperature increase | Heat-Sink temperature | Temperature difference (OBC-HeatSink) |
| 8 | 31 | 5↑ | 25 | 6 | 68 | 5↑ | 64 | 4 |
| 4~5 | 33 | 8↑ | 25 | 8 | 69 | 7↑ | 63 | 6 |
| 0 | 85 | 60↑ | 42 | 43 | 86 | 25↑ | 60 | 26 |

Figure 4:
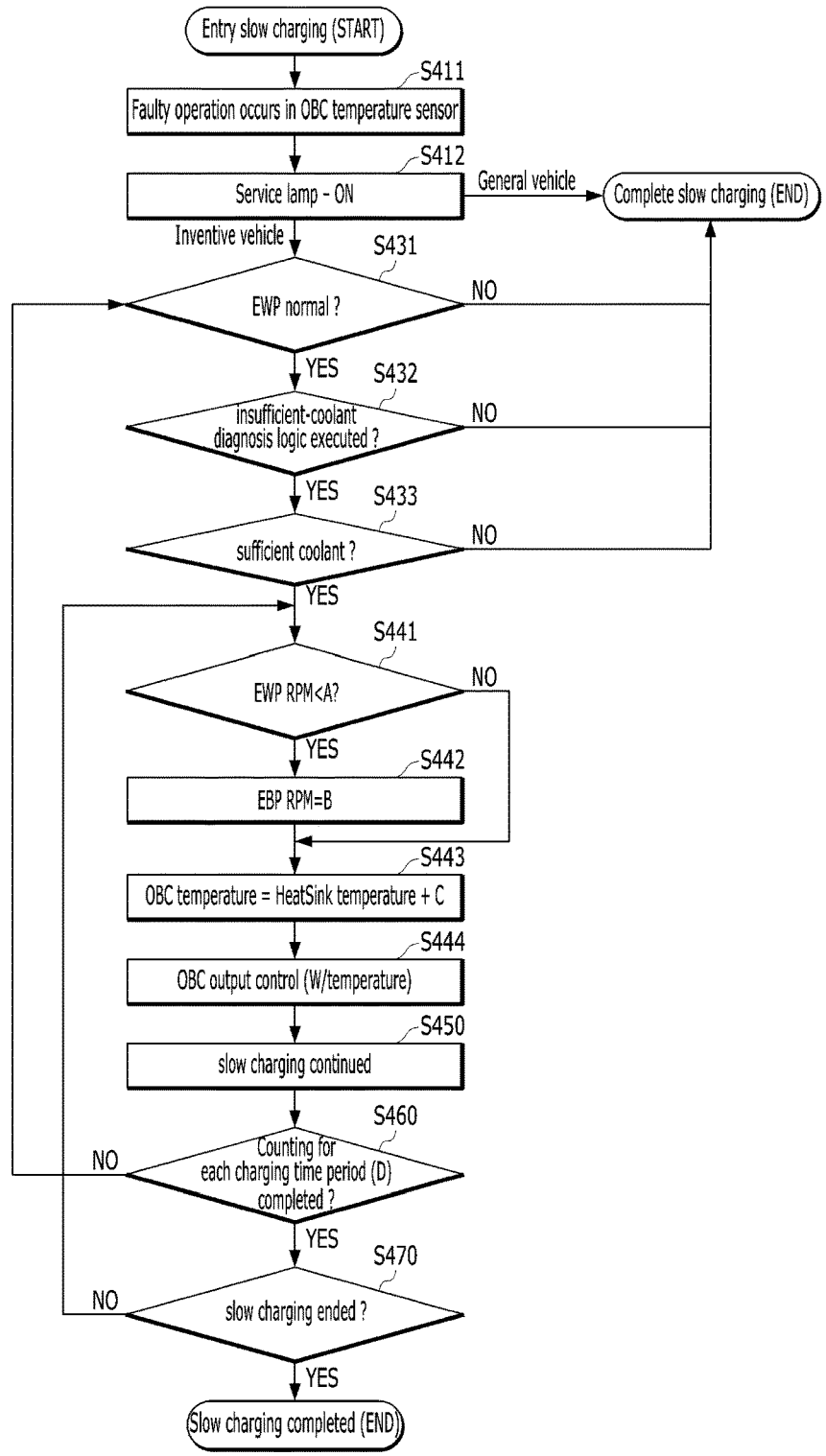
FIG. 4 is a flowchart illustrating a charging control method according to an exemplary embodiment of the present invention.

Referring to Table 1, when the amount of coolant circulation (i.e., a coolant flow rate) is about 4-8 LPM, a difference between the OBC temperature and the heat-sink A charging method according to the exemplary embodiment of the present invention will hereinafter be described with reference to FIG. 4. FIG. 4 is a flowchart illustrating a charging control method according to an exemplary embodiment of the present invention. The method described herein below may be executed by the overall controller of the system.

Referring to FIG. 4, when the faulty operation of the OBC temperature sensor is detected during the beginning of slow charging (S411), a service lamp that indicates the faulty operation may be turned on (S412). Whereas a service lamp of a general vehicle is turned on and at the same time slow charging in the general vehicle is completed (S420), steps starting from the step S431 may be performed in the inventive vehicle.

In particular, the controller may be configured to determine whether the EWP operates normally (S431). In other words, the controller may be configured to determine whether the EWP malfunctions, further details of which will be discussed below. When the EWP operates normally, a logic for diagnosing whether the amount of coolant (i.e., a sufficient-coolant diagnosis logic) is insufficient (S432) is performed. When the amount of coolant is sufficient (S433), the EWP control procedure may be started. In particular, information regarding whether the EWP operates normally and the logic for determining whether the amount of coolant is insufficient may be performed based on heat-sink temperature change information for each predetermined condition shown in Table 1.

In the EWP control procedure, when a revolutions per minute (RPM) of the EWP is less than a predetermined value 'A' (S441), the RPM may be adjusted to a predetermined value 'B' (S442). When no faulty operation occurs in the EWP RPM, the OBC temperature may be estimated by adding an error correction value (C) to the heat-sink temperature (S443), and the OBC output may be adjusted based on the estimated temperature (S444). As a result, slow charging may be continued (S450). Prior to completion of the slow charging (S470), information regarding whether a faulty operation occurs in the EWP or information regarding whether the amount of coolant is insufficient may be determined at intervals of a predetermined time D (S460).

In the steps shown in FIG. 4, although, for example, A may be set to 1000, B may be set to 2000, C may be set to 8, and D may be set to 60 seconds, the scope or spirit of the present invention is not limited thereto, and it is obvious to those skilled in the art that the respective values may also be changed to other values according to vehicle structures.

Through the above-mentioned method, under the assumption that the EWP and the amount of coolant are normal although the faulty operation occurs in the OBC temperature sensor during slow charging for the vehicle, the slow charging for the vehicle may be continuously performed, and thus, vehicle reliability and driver's satisfaction may be increased. Specifically, the charging method according to the exemplary embodiment eliminate the requirement of a separate hardware to the vehicle, and thus, production costs of the vehicle are not increased from the viewpoint of a manufacturing company of the vehicle.

The above-mentioned exemplary embodiments of the present invention may be implemented as code that may be written to a non-transitory computer-readable recording medium and may thus be read by a computer. The non-transitory computer-readable recording medium may be any type of recording device in which data may be stored in a computer-readable manner Examples of the computer-readable recording medium include an HDD (Hard Disk Drive), an SSD (Solid State Drive), an SDD (Silicon Disc Drive), a ROM, a RAM, a CD-ROM, a magnetic tape, a floppy disk, optical data storage, etc.

As is apparent from the above description, a vehicle according to at least one exemplary embodiment of the present invention may more efficiently perform battery charging using external power. Specifically, although the temperature sensor of the OBC malfunctions, the vehicle according to the exemplary embodiment may be capable of performing slow charging control through information capable of substituting for OBC temperature.

Those skilled in the art will appreciate that the present invention may be performed out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for controlling charging a battery of a vehicle configured to perform a charging operation using external power, comprising:
   determining, by a controller, whether a refrigerant circulation device operates normally and an amount of refrigerant is not in an insufficient condition when a faulty operation is detected in a temperature sensor of a charger;
   estimating, by the controller, a temperature of the charger using a temperature of a heat dissipation device of the controller through which the refrigerant passes when the refrigerant circulation device operates normally and the amount of refrigerant is not in the insufficient condition;
   adjusting, by the controller, output power generated by the charger based on the estimated temperature; and
   stopping, by the controller, charging through the charger when at least one of the refrigerant circulation device and the amount of refrigerant is in the insufficient condition.

2. The method according to claim 1, wherein the estimating the temperature of the charger includes:
   adding, by the controller, a predetermined correction coefficient to the temperature of the heat dissipation device.

3. The method according to claim 1, wherein the determining whether the refrigerant circulation device operates normally and the amount of refrigerant is not in the insufficient condition is repeatedly performed at intervals of a predetermined time.

4. The method according to claim 1, further comprising:
   determining, by the controller, a driving speed of the refrigerant circulation device when the refrigerant circulation device operates normally and the amount of refrigerant is not in the insufficient condition.

5. The method according to claim 4, further comprising:
   setting, by the controller, the driving speed to a second reference value when the driving speed is less than a first reference value.

6. The method according to claim 1, wherein the charger includes an On-Board Charger (OBC) and the charging operation using the external power includes slow charging.

7. The method according to claim 1, wherein the refrigerant includes a coolant, the refrigerant circulation device includes an electric water pump (EWP), and the heat dissipation device through which the refrigerant passes includes a heat sink of an electronic power control unit (EPCU).

8. The method according to claim 1, wherein the determining of whether the refrigerant circulation device operates normally and the amount of refrigerant is not in the insufficient condition is performed by referring to a predetermined refrigerant flow rate and temperature change information of the heat dissipation device based on a cooling temperature.

9. A computer-readable recording medium having recorded thereon a program for executing the method for controlling charging of a vehicle according to claim 1.

10. A vehicle for performing a charging operation using external power, comprising:
 a charger having a temperature sensor and configured to charge a battery using the external power; and
 an electronic power control unit (EPCU) configured to determine whether a refrigerant circulation device operates normally and an amount of refrigerant is not in an insufficient condition when the temperature sensor malfunctions, estimate a temperature of the charger using a temperature of a heat dissipation device contained in the electronic power control unit (EPCU) when the refrigerant circulation device operates normally and the amount of refrigerant is not in the insufficient condition, and adjust output power generated by the charger based on the estimated temperature,
 wherein the refrigerant circulated by the refrigerant circulation device passes through the charger and the electronic power control unit (EPCU) through a single cooling channel, and
 wherein the electronic power control unit (EPCU) is configured to stop charging through the charger, when the determination result indicates that at least one of the refrigerant circulation device and the amount of refrigerant is in the insufficient condition.

11. The vehicle according to claim 10, wherein the electronic power control unit (EPCU) is configured to estimate the temperature of the charger by adding a predetermined correction coefficient to the temperature of the heat dissipation means.

12. The vehicle according to claim 10, wherein the electronic power control unit (EPCU) is configured to repeatedly determine whether the refrigerant circulation device operates normally and the amount of refrigerant is not in the insufficient condition at intervals of a predetermined time.

13. The vehicle according to claim 10, wherein the electronic power control unit (EPCU) is configured to determine a driving speed of the refrigerant circulation device, when the refrigerant circulation device operates normally and the amount of refrigerant is not in the insufficient condition.

14. The vehicle according to claim 13, wherein the electronic power control unit (EPCU) is configured to set the driving speed to a second reference value, when the driving speed is less than a first reference value.

15. The vehicle according to claim 10, wherein the charger includes an On-Board Charger (OBC), and the charging operation using the external power includes slow charging.

16. The vehicle according to claim 10, wherein the refrigerant includes a coolant, the refrigerant circulation device includes an electric water pump (EWP), and the heat dissipation device includes a heat sink of an electronic power control unit (EPCU).

17. The vehicle according to claim 10, wherein the electronic power control unit (EPCU) is configured to determine whether the refrigerant circulation device operates normally and the amount of refrigerant is not in the insufficient condition by referring to a predetermined refrigerant flow rate and temperature change information of the heat dissipation device based on a cooling temperature.

* * * * *